Patented Oct. 4, 1949

2,483,434

UNITED STATES PATENT OFFICE 2,483,434

DISUBSTITUTED AMINO-ALKYL BENZHYDRYL AMINES

George Rieveschl, Jr., Grosse Pointe Woods, Mich., assignor to Parke, Davis & Company, Detroit, Mich., a corporation of Michigan No Drawing. Application April 8, 1946, Serial No. 660,406

4 Claims. (Cl. 260—570)

This invention relates to certain organic diamines and to methods for obtaining the same. This application is a continuation-in-part of my copending application, Serial No. 531,639, filed April 18, 1944 from which Patent No. 2,421,714 was issued June 3, 1947.

More particularly, this invention relates to ω-N-aminoalkyl benzhydryl amines, the free bases of which have the formula

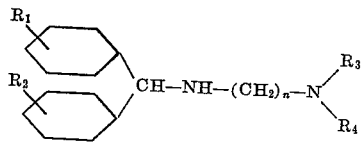

where $n$ is one of the integers two and three, $R_1$ and $R_2$ are the same or different substituents and represent hydrogen, an alkyl radical containing 1 or 2 carbon atoms or an alkoxy radical containing 1 or 2 carbon atoms, $R_3$ and $R_4$ are the same or different alkyl radicals containing 1 to 3 carbon atoms inclusive or $R_3$ and $R_4$ taken with —N may be a saturated six-membered heterocyclic ring such as piperidine, a methyl substituted piperidine, morpholine, a methyl substituted morpholine, thiomorpholine and the like. The compounds of this invention may be obtained as the free base having the formula given above or they may be obtained in the form of their acid addition salts with organic and inorganic acids. Some typical examples of these salts are the hydrobromide, hydrochloride, phosphate, sulfate, citrate, tartrate, salicylate, benzoate and acetate salts.

I have found that compounds of the above general formula may be obtained in high yields by the reaction of a benzhydryl halide of the formula

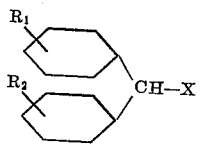

with an aminoalkylamine of the formula

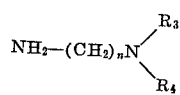

Alternatively, a benzhydrylamine of the formula

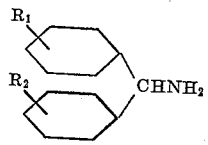

can be reacted with an aminoalkyl halide of the formula

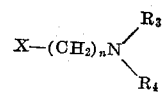

to obtain the new compounds of the invention. In the above formulas $n$, $R_1$, $R_2$, $R_3$ and $R_4$ have the same significance as given above and X is a chlorine, bromine or iodine atom.

The processes for preparing these new compounds can be carried out in the same manner. I have found that the reaction can be effected either in the presence or absence of an inert organic solvent. Some of the inert organic solvents which are suitable for use as reaction mediums are benzene, toluene, terpentine, pyridine, di-n-butyl ether, xylene and the like. When the reaction is carried out in either the presence of or absence of a solvent I find it preferable from the standpoint of yields to use at least about two moles of the amine reactant for each mole of the halide used.

The compounds of the present invention are useful as antihistamine agents and as intermediates in the synthesis of other valuable organic compounds.

*Example 1.—N-β-diethylaminoethyl benzhydrylamine*

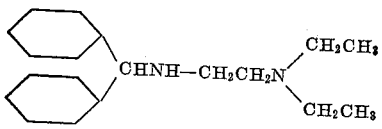

A mixture of 98.8 g. of benzhydryl bromide and 100 g. of β-diethylaminoethylamine is allowed to react spontaneously and when the reaction has subsided the mixture is heated on a steam bath for three hours. The mixture is cooled, treated with water and the resulting mixture made strongly alkaline with sodium hydroxide solution. The free base of the product which separates is extracted with ether. The extract is washed with water and then extracted with dilute hydrochloric acid. The free base of the N-β-diethylaminoethyl benzhydrylamine is liberated from the acid aqueous extracts by treatment with alkali and extracted with ether. After drying, the ether solution of the free base is treated with an excess of dry hydrogen chloride gas to precipitate the product as the dihydrochloride salt. The crude salt is collected and purified by recrystallization from absolute ethanol; M. P. 246° C.

Example 2.—N-γ-diethylaminopropyl benzhydrylamine

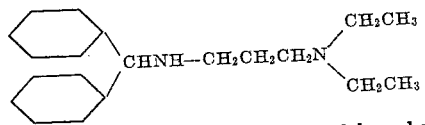

A mixture consisting of 264 g. of benzhydrylamine and 75 g. of freshly distilled γ-diethylaminopropyl chloride is stirred and heated at 135° C. for eight hours. The reaction mixture is cooled, treated with 175 cc. of 5 N sodium hydroxide solution and extracted with ether. The ether extract is dried, the ether distilled and the residue distilled under reduced pressure, c. a. 1 mm. of mercury, to obtain the free base of the desired N-γ-diethylaminopropyl benzhydrylamine as a light yellow oil. The free base can be converted to the dihydrochloride salt by dissolving the base in ether and treating the solution with an excess of dry hydrogen chloride. The white dihydrochloride salt which separates from the ether solution is collected and purified by recrystallization from absolute ethanol. M. P. 141–145.

Example 3.—N-β-1-piperidylethyl benzhydrylamine

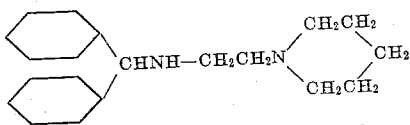

A mixture consisting of 124 g. of benzhydryl bromide and 128 g. of β-1-piperidylethylamine is warmed on a steam bath for five hours, cooled and the reaction mixture treated with 100 cc. of 5 N sodium hydroxide solution. The resulting mixture is extracted with ether, the ether extract dried and the ether distilled. The residue is distilled under reduced pressure to obtain the desired N-β-1-piperidylethyl benzhydrylamine.

The free base can be converted to the dihydrobromide salt by dissolving the base in absolute ethanol and adding an excess of alcoholic hydrogen bromide. The salt is precipitated from the solution by the addition of ether, collected and purified by recrystallization from absolute ethanol.

By using an equivalent amount of β-3-methyl-1-piperidylethylamine in the above procedure instead of the β-1-piperidylethylamine, one obtains N-β-3-methyl-1-piperidylethyl benzhydrylamine.

Example 4.—γ-N-4-morpholinylpropyl benzhydrylamine

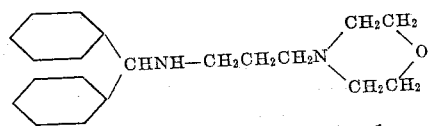

A mixture consisting of 142 g. of γ-1-morpholinylpropylamine and 101 g. of benzhydryl chloride in 300 cc. of dry pyridine is heated in a closed vessel at 150° C. for six hours. After the reaction mixture has cooled, 100 g. of flake sodium hydroxide is added and the mixture stirred for twelve hours at room temperature. The sodium chloride-sodium hydroxide is removed by filtration and the pyridine removed from the filtrate by distillation. The residue is distilled under reduced pressure, c. a. 1 mm. of mercury, to obtain the desired γ-N-4-morpholinylpropyl benzhydrylamine.

The citrate salt of γ-N-4-morpholinylpropyl benzhydrylamine is prepared by dissolving the free base in ether and adding an excess of citric acid dissolved in ether. The light amphorous product which separates is collected and dried.

β - N - dimethylaminoethyl benzhydrylamine may be obtained by the above procedure by using an equivalent amount of β-dimethylaminoethylamine in place of the γ-1-morpholinylpropylamine.

Example 5.—β-N-di-n-propylaminoethyl 4,4'-dimethylbenzhydrylamine

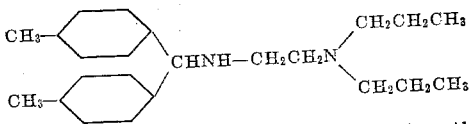

A mixture consisting of 136 g. of 4,4'-dimethylbenzhydryl bromide and 144 g. of β-di-n-propylaminoethylamine is heated on a steam bath for six hours, cooled and treated with 200 cc. of 5 N sodium hydroxide solution. The mixture is extracted with ether, the ether extract dried and the ether distilled. The residue which consists of a mixture of the desired product and di-n-propylaminoethylamine is heated under 1 mm. of mercury at 80° C. in order to remove the di-n-propylaminoethylamine. The residue, after cooling, is taken up in ether, the solution treated with an excess of dry hydrogen chloride gas and the crude dihydrochloride salt which separates collected. The pure white crystalline dihydrochloride salt of β-N-di-n-propylaminoethyl 4,4'-dimethyl benzhydrylamine can be obtained by recrystallization of the crude salt from absolute ethanol-ether mixture.

Example 6.—β-N-methylethylaminoethyl 2-methoxybenzhydrylamine

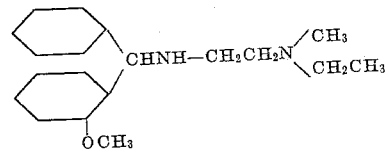

A mixture consisting of 138 g. of 2-methoxybenzhydryl bromide and 102 g. of β-methylethylaminoethylamine is heated for four hours at 100° C., cooled and the mixture treated with about 250 cc. of 5 N sodium hydroxide solution. The mixture is extracted with ether, the ether extract washed with water and then the ether solution extracted with several portions of dilute hydrochloric acid. The free base of the desired product is liberated from the aqueous acid extracts by treatment with sodium hydroxide solution and extracted with ether. The ether extract after washing with water and drying is treated with an excess of dry hydrogen bromide gas. The crude dihydrobromide salt which separates is collected and purified by recrystallization from absolute ethanol.

What I claim as my invention is:

1. A compound of the class consisting of a free base and its acid addition salts, said free base having the formula

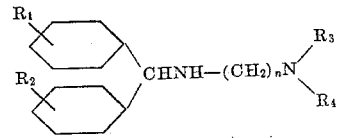

where $n$ is one of the integers two and three, $R_1$ and $R_2$ are members of the class consisting of hydrogen, alkyl radicals containing 1 to 2 carbon atoms and alkoxy radicals containing 1 to 2 carbon atoms, $R_3$ and $R_4$ are members of the class consisting of alkyl radicals containing 1 to 3 carbon atoms inclusive and further members where $R_3$ and $R_4$ taken with —N< form a saturated six-membered heterocyclic ring.

2. A compound of the formula

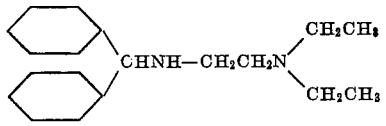

3. A compound of the formula

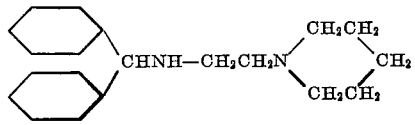

4. A compound of the formula

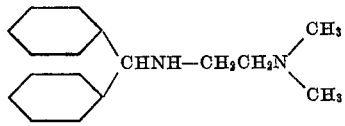

GEORGE RIEVESCHL, JR.

REFERENCES CITED

The following references are of record in the file of this patent:

UNITED STATES PATENTS

| Number | Name | Date |
| --- | --- | --- |
| 2,334,782 | Martin | Nov. 23, 1943 |

OTHER REFERENCES

Alphen et al., "Red. Trav. Chim.," vol. 54 (1935) pp. 361–365.